United States Patent [19]
Connor et al.

[11] 3,921,726
[45] Nov. 25, 1975

[54] CULTIVATOR HAVING PLURALITY OF LATERALLY ADJUSTABLE TOOL-SUPPORTING BEAMS

[75] Inventors: Donald E. Connor, Plainfield; Charles Boetto, Naperville, both of Ill.

[73] Assignee: International Harvester Company, Chicago, Ill.

[22] Filed: Jan. 6, 1975

[21] Appl. No.: 538,675

[52] U.S. Cl. ............... 172/646; 172/239; 172/484; 172/707; 172/741
[51] Int. Cl.² ........................................ A01B 19/08
[58] Field of Search .......... 172/239, 254, 307, 395, 172/439, 451, 476, 477, 484, 614, 615, 616, 619, 620, 624, 629, 631, 633, 636, 639, 641, 644, 645, 646, 649, 654, 656, 659, 660, 666, 667, 673, 675, 687, 688, 691, 694, 696, 707, 741, 762, 763, 776; 184/105 B

[56] References Cited
UNITED STATES PATENTS

| 501,887 | 7/1893 | La Dow | 172/660 X |
|---|---|---|---|
| 1,168,202 | 1/1916 | Haskett et al. | 172/673 |
| 1,375,854 | 4/1921 | Mader | 172/673 X |
| 2,145,007 | 1/1939 | Foster | 172/476 X |
| 2,730,030 | 1/1956 | Chambers | 172/691 X |
| 2,751,834 | 6/1956 | Hines, Sr. et al. | 172/688 X |
| 3,150,722 | 9/1964 | Tromm | 172/707 |
| 3,191,689 | 6/1965 | van der Lely | 172/687 |
| 3,208,535 | 9/1965 | Fischer | 172/667 X |
| 3,500,936 | 3/1970 | Vigen | 172/763 X |
| 3,533,475 | 10/1970 | Buchanan | 172/307 X |
| 3,537,532 | 11/1970 | Padgett | 172/741 |
| 3,539,019 | 11/1970 | Mattson et al. | 172/688 X |
| 3,627,061 | 12/1971 | Sample | 172/646 X |

FOREIGN PATENTS OR APPLICATIONS

| 637,913 | 5/1950 | United Kingdom | 172/654 |
|---|---|---|---|
| 1,198,101 | 8/1965 | Germany | 172/707 |

*Primary Examiner*—Anton O. Oechsle
*Assistant Examiner*—R. T. Stouffer
*Attorney, Agent, or Firm*—F. David AuBuchon; Floyd B. Harman

[57] ABSTRACT

A linkage support for the ground tools of a cultivator gang and embodying a gauge wheel supported tool carriage which is connected to the head bracket of a tractor-drawn tool bar using a four bar parallelogram linkage so that it may rise and fall in accordance with an undulatory ground surface without a change in attitude with no fore and aft rocking of the carriage which, otherwise, would cause unequal ground tool penetration. Lateral tool-supporting beams associated with the carriage are provided with facilities whereby the ground tools may be clamped thereto in appropriate positions of lateral adjustment, and the beams themselves are capable of lateral adjustment to accommodate either right or left side installation of the ground tools. Additional facilities are provided whereby the gauge wheel supporting member may be clamped in varying positions of vertical adjustment to collectively vary the extent of ground tool penetration.

10 Claims, 9 Drawing Figures

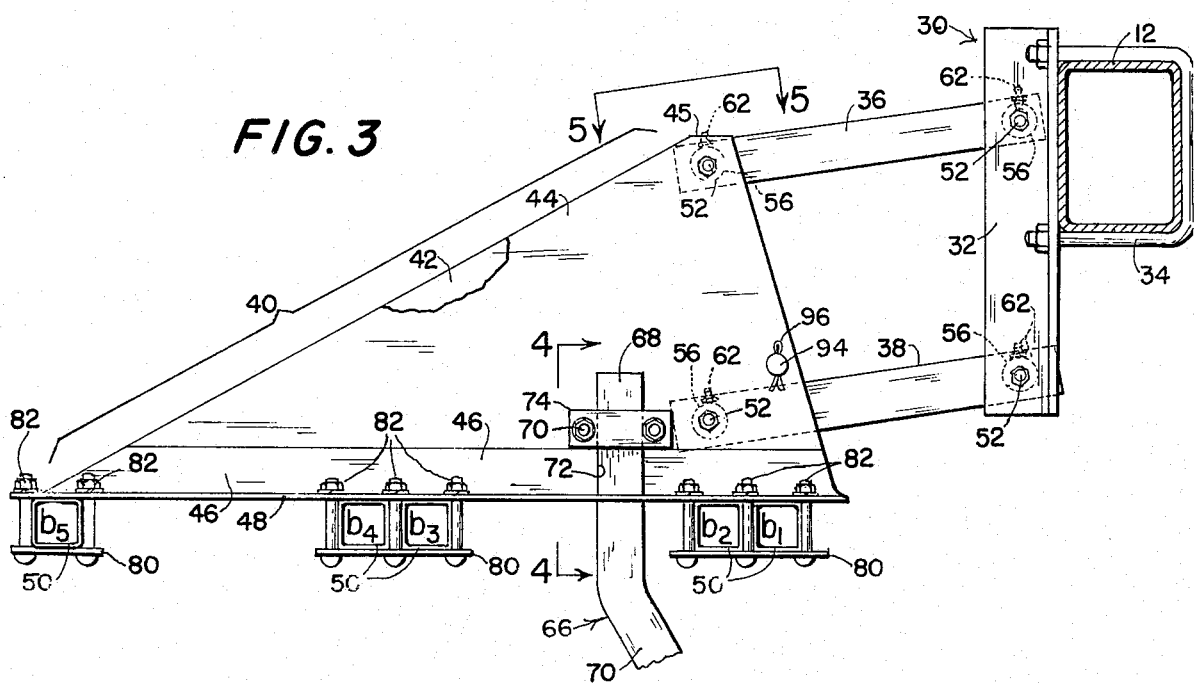
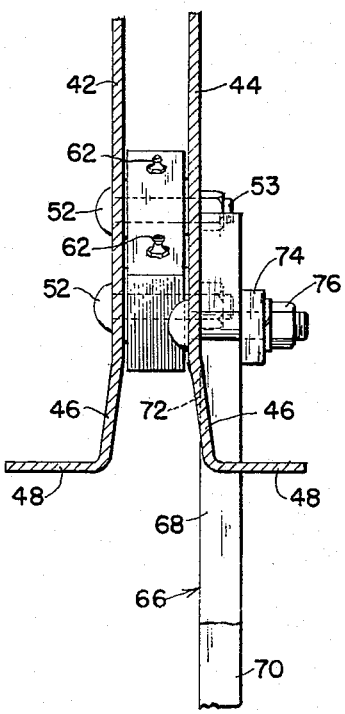
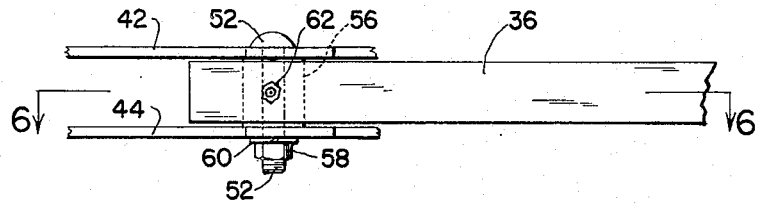
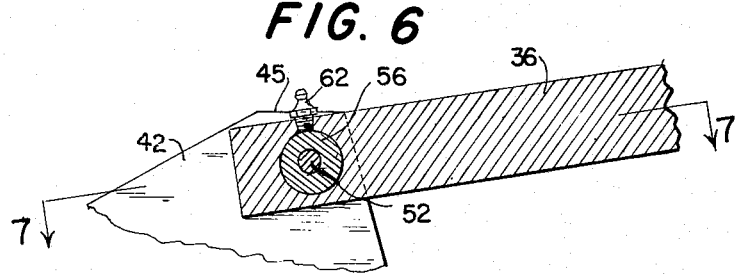
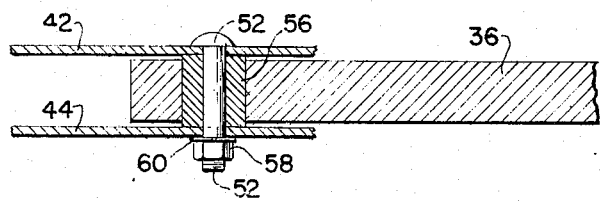

CULTIVATOR HAVING PLURALITY OF LATERALLY ADJUSTABLE TOOL-SUPPORTING BEAMS

The present invention relates to multiple row cultivators and has particular reference to a cultivator of the type which is provided with a transverse tool bar having hitch facilities whereby it may be operatively connected to an agricultural tractor for propulsion purposes.

Still more specifically, the present multiple row cultivator is concerned with that class of agricultural implement wherein a plurality of cultivator gangs in the form of carriages having ground tools mounted thereon are each drawn or pulled by a pair of draw links which constitute the swinging links of a four bar linkage, a head bracket on the tool bar constituting the fixed link, and portions of the carriage constituting the floating link of the four bar linkage. In connection with such implements, each gang carriage also serves to support a gauge wheel by means of which the depth of cultivation may be regulated.

Heretofore, in connection with cultivator implements of this general class, it has been the practice to arrange the ground tools of each gang in V fashion, such arrangement being convenient where the use of three ground tools are concerned by using a T-shaped gang frame with the tools being anchored to the extremities of the T. Where five ground tools are concerned, a tapered H-shaped frame is employed with the crossbar of the H being extended rearwardly so as to provide five extremities for attachment of the ground tools. In either instance, the gauge wheel support is attached to the main leg of the T or to a forward extension of the crossbar of the H while at least one pair of ground tools are secured to and supported on opposite sides of the frame by the same common transverse beam so that such beam is placed under considerable torsion and is thus twisted during cultivation. Furthermore, particularly where five or more ground tools are employed, the use of a relatively long frame member with longitudinally spaced transverse tool supporting beams is impractical due to the limitations of structural beam strength and, as a consequence, it is necessary to effect a relatively close spacing of the ground tools with a consequent small area tool cluster.

The present invention is designed to overcome the above-noted limitation which is present in connection with conventional multiple row cultivators and, toward this end, the invention contemplates the provision of a novel four bar linkage arrangement wherein each gang carriage is of a composite nature and embodies a pair of triangular spaced apart side plates, one lower edge of the composite carriage being of appreciable length and having outturned bolting flanges therealong for attachment thereto of a plurality of transverse beams, to the extremities of which the ground tools may be secured. Because of the relatively great length of such bolting flanges, it is not necessary to employ the same tool-supporting beam for the anchoring of any given pair of laterally spaced ground tools and, instead, according to the invention, the ground tools of such pair are provided with separate transversely extending beams, the beams for each pair of ground tools being substantially contiguous. Thus, in no instance is a given beam obliged to support more than a single ground tool while at the same time only an inconsequential and negligible departure from the usual transverse alignment of ground tools is resorted to. By such use of an individual transverse beam for each ground tool, torsional stresses at the points of connection between the beam and the carriage frame which supports the same are greatly alleviated. Furthermore, because of the length of the bolting flanges, comparatively wide longitudinal spacing of the pairs of ground tool supporting beams is made possible so that a larger area tool cluster may be achieved without exceeding the limits of structural strength of the carriage.

A further novel feature of the present invention resides in the manner in which the gauge wheel supporting member or upright is adjustably anchored to the cultivator gang carriage, the arrangement being such that two reaction points along the vertical extent of such member are provided, thus assuring greater rigidity than is prevalent with the single adjustable clamping device which ordinarily is employed for retaining the gauge wheel supporting member.

Yet another further novel feature of the invention resides in the use of simple flat clamping plates with associated nut and bolt assemblies for clamping the aforementioned ground tool supporting beams to the relatively long bolting flanges of the triangular plates which constitute the gang carriage, and also for clamping the gauge wheel supporting member to such plates in various adjusted positions, as well as for clamping the ground tools to the supporting beams. By the use of such clamping means, utilizing bolts having diameters of uniform size, fewer wrench changes are required for cultivator assembly or disassembly, either for tool changeover operations or for tool repair and replacement. Furthermore, the use of such flat clamping plates, in combination with the use of hollow square tubular beams for supporting the ground tools, enables the selective use of several sizes of hollow beams without necessitating the use of specially constructed clamping devices.

A still further novel feature of the invention is concerned with a novel means for adjustably clamping the ground tools to the aforementioned hollow supporting beams, the adjustment being infinitely variable and being such that no bolt hole drilling of the beams is required when different lateral tool displacements are resorted to.

The provision of a cultivator linkage support for ground tools which is relatively simple in its construction and which therefore may be manufactured at a low cost; one which is rugged and durable and which therefore is unlikely to get out of order; one which is capable of ease of assembly, disassembly or adjustment so that it may readily be attended to in the field without requiring skilled labor; and one which otherwise is well adapted to perform the services required of it, are further desirable features which have been borne in mind in the production and development of the present invention.

The provision of a cultivator linkage support such as has briefly been outlined above and possessing the stated advantages, constitutes the principal object of the present invention. Other objects and advantages of the invention, not at this time enumerated, will readily suggest themselves as the nature of the invention is better understood.

In the accompanying two sheets of drawings forming a part of this specification, one illustrative embodiment of the invention has been shown.

BRIEF DESCRIPTION OF THE DRAWINGS

FIG. 3 is a further enlarged side elevational view of the linkage assembly disclosed in FIG. 2, but with the ground tools omitted in the interests of clarity;

FIG. 4 is a sectional view taken substantially on the line 4—4 of FIG. 3 with the ground tools and their supporting beams omitted;

FIG. 5 is a fragmentary top plan view of a limited portion of the structure shown in FIG. 3; the view being taken on line 5—5 of FIG. 3 and in the direction of the arrows;

FIG. 6 is a sectional view taken substantially on the line 6—6 of FIG. 5;

FIG. 7 is a sectional view taken substantially on the line 7—7 of FIG. 6;

DESCRIPTION OF THE PREFERRED EMBODIMENT

Figure 1:
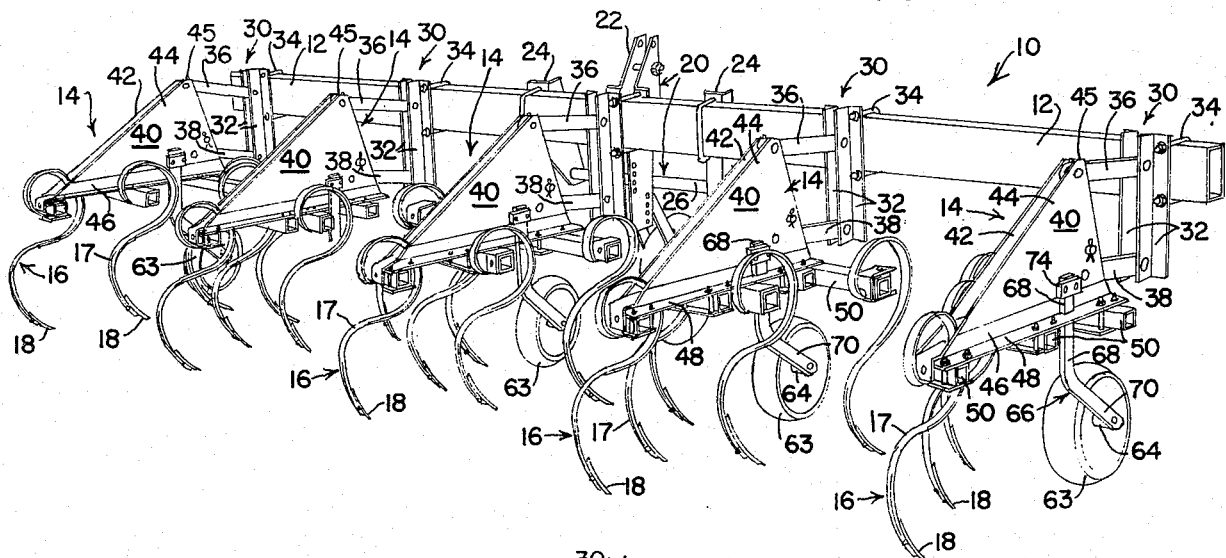
FIG. 1 is a right rear perspective view of a cultivator farm implement embodying a plurality of the improved tool-supporting linkage assemblies of the present invention.

Referring now to the drawings in detail and in particular to FIG. 1, a cultivator farm implement embodying the present invention is designated in its entirety by the reference numeral 10 and it embodies the usual main frame which is in the form of a transverse tool bar 12 on which there are supported a plurality of trailing cultivator gangs 14. In the illustrated form of the invention, the cultivator 10 is designed as a four-row implement having five such gangs 14 and wherein each of the three medial gangs has associated therewith five ground tools 16, while each of the two outside or end gangs 14 has associated therewith only three such ground tools. The exemplary ground tools 16 selected for illustration herein are in the form of conventional spring teeth 17 of generally S-shaped configuration and having dual point shovels 18 or sweeps associated therewith (see also FIG. 2), but it is to be understood that other forms of conventional ground tools such as vibra shank teeth may be employed if desired. Also, blade or tent type shields, rolling guide fins and the like may be used in combination with the conventional ground tools.

The tool bar 12 is of hollow rectangular construction and it is adapted to be tractor-drawn in a forward direction. Accordingly it is provided with a conventional three point hitch 20 (FIG. 1), the latter including the usual upstanding central hitch bracket 22 and a pair of laterally spaced hitch brackets 24 which serve to support therebetween a spreader bar 26.

The various cultivator gangs 14 are substantially identical in construction and, therefore, a description of one of them will suffice for them all. Each gang 14 involves in its general organization a head bracket 30 (see alos FIGS. 2 and 3) embodying a pair of vertically disposed, laterally spaced, angle pieces 32 the latter being clamped to the tool bar 12 by U-bolt assemblies 34. Disposed rearwardly of the head bracket 30 and operatively connected thereto by upper and lower draw links 36 and 38 respectively, is a floating tool carriage 40, the latter serving to support thereon the associated ground tools 16 in a manner and for purposes that will be made clear presently.

As best shown in FIGS. 3 and 4, the tool carriage 40 is comprised of a framework including a pair of laterally spaced, vertically disposed, parallel plates 42 and 44, such plates being generally of right triangular configuration with their hypotenuses extending horizontally. Actually, in the illustrated form of the plates 42 and 44, the right angle apices of the triangle are truncated as indicated at 45 in FIGS. 2 and 3 so that the configuration of each plate 42 and 44 is in reality that of a trapezoid. However, due to the extremely short length of the truncation, throughout the discussion of the plates 42 and 44, they will, insofar as practical be regarded as being triangular. The two acute angles of each triangle are approximately 30° and 60° respectively, and the plates are so disposed that the shortest edges thereof are presented forwardly and constitute leading edges, while the adjacent longer upper edges of the plates constitute trailing edges.

Figure 2:
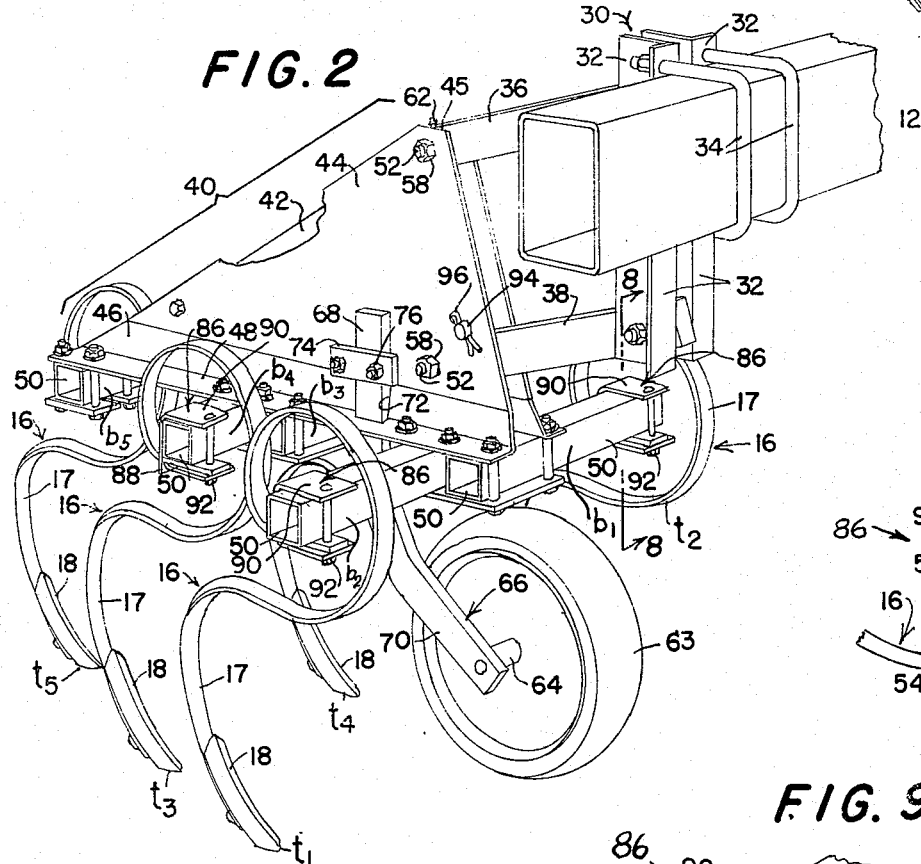
FIG. 2 is an enlarged fragmentary right front perspective view, showing one of the tool-supporting linkage assemblies.

As clearly shown in FIGS. 2 and 4, the lower edge regions of the two parallel plates 42 and 44 diverge outwardly away from each other as indicated at 46, while the extreme lower edges of the plates are turned laterally outwardly to provide bolting flanges 48, to the underneath sides of which there are secured a plurality of transversely extending tool-supporting members or beams 50, the nature and function of which will be set forth presently.

The two plates 42 and 44, and consequently the entire tool carriage 40, re pivotally connected to the rear end regions of the upper and lower draw links 36 and 38 while the forward end regions of such links are similarly pivotally connected to the angle pieces 32 the arrangement being such that a four bar linkage is established by reason of the two links 36 and 38 and the portions of the plates 42 and 44 which extend between the pivot points for the rear ends of the links, as well as the portions of the head bracket 30 which extend between the pivot points for the forward ends of the links. Specifically, and with reference to FIG. 3, the four bar linkage which is thus established is in the form of a parallelogram inasmuch as the effective lengths of the upper and lower links 36 and 38 are the same and inasmuch as the distance between the pivot points at the rear end of the links and the distance between the pivot points at the front ends of the links are equal.

The pivotal connections for the opposite ends of the upper and lower parallel links 36 and 38 are identical and each connection embodies a through-bolt 52 (FIGS. 5, 6 and 7) and an encompassing spacer bushing member 56. In the case of the pivotal connections for the rear ends of the links 36 and 38, a clamping nut 58 and washer 60 serve to clamp the plates 42 and 44 hard against the spacer bushing member 56 whereas, in the case of pivotal connections for the front ends of the links 36 and 38, such nut and washer serves to clamp the opposed flanges of the angle pieces 32 hard against the spacer bushing member. In each instance, a pressure grease fitting 62 (see FIG. 6) supplies lubricating grease to the outer bearing surface of the bushing 56.

Referring now particularly to FIG. 3, it will be observed that, in the aforementioned four bar linkage by means of which the tool-supporting carriage is drawn or pulled by the tool bar 12, the head bracket 30 establishes a fixed vertical base link, the upper and lower draw links 36 and 38 establish a pair of swinging links, while the carriage 40 itself itself establishes a floating link. This floating link at all times remains vertical inasmuch as it constitutes the side of the prarallelogram structure which is opposite the fixed vertical base link. It is to be noted that the rear end region of the lower link 38 projects between the two triangular plates 42 and 44 an appreciable distance and is pivoted to such plates at a point in vertical alignment with the pivot point for the rear end of the upper link 36. Since the floating link of such four bar linkage remains at all times vertical, and since this floating link is a fixed span of the carriage 40, the entire carriage itself is a floating carriage which maintains the same attitude at all times with the lateral flanges 48 (FIG. 4) along the lower edges or hypotenuses of the triangular plates 42 and 44, as well as the transversely extending tool-supporting members supported thereby, extending substantially parallel to the ground surface.

Each floating carriage 40 has associated therewith the usual gauge wheel 63 which, as best illustrated in FIGS. 2 and 4, is rotatable on a shaft or axle 64 carried at the lower end of a supporting bar 66 having an upper vertical section 68 and a lower forwardly and downwardly inclined section 70. The lateral flange 48, as well as the outwardly offset portion 46 of the triangular plate 44, is recessed as indicated at 72 for reception therethrough of the upper vertical section 68, while a clamping plate 74 and associated nut and bolt assemblies 76 serve to clamp the upper region of the vertical section 68 flat against the outer side face of the plate 44. It will be understood that, alternatively, the gauge wheel supporting bar 66 may be similarly attached to the plate 42 if desired.

Referring now to FIG. 2 the five ground tools 16 of each of the three medial cultivator gangs 14 are arranged in the usual wedge-shaped pattern so as to provide a pair of widely spaced leading tools which have been labelled $t1$ and $t2$ in FIG. 2, a pair of moderately spaced medial tools $t3$ and $t4$, and a single trailing tool $t5$. Each ground tool is individually supported by a respective tool supporting member or beam 50, each such beam being in the form of a structural steel tube of rectangular cross section. The two leading ground tools $t1$ and $t2$ are supported by beams 50 which have been labelled $b1$ and $b2$ in FIGS. 2 and 3 and which occupy contiguous positions on the flanges 48 of the triangular plates 42 and 44 near the forward ends of such flanges, such beams being clamped to the underneath side of such flanges by a clamping plate 80 and associated clamping nut and bolt assemblies 82. The two medial ground tools $t3$ and $t4$ are supported by beams which have been labelled $b3$ and $b4$ and they occupy contiguous positions on the flanges 48 in the medial region of the latter. The beams $b3$ and $b4$ are similarly clamped to the flanges 48 by a clamping plate and nut bolt assemblies. The trailing ground tool $t5$ is supported by a beam $b5$ which also is clamped to the flange by a clamping plate and nut and bolt assemblies, such beam being disposed close to the rear ends of the flanges 48.

The tool-supporting carriage 40 which is associated with the two outside cultivator gangs 14 is identical with the carriages that are associated with the three medial cultivator gangs. However, only three ground tools 16 are employed on such outside gangs. Accordingly, and as shown in FIG. 1, the tool-supporting frame 50 labelled $b2$ and $b4$ on right end carriage and $b1$ and $b3$ on left end carriage, together with their associated tools 16, are omitted, this being accomplished by the simple expedient of failure to install them at the time the cultivator is assembled.

The beams 50 project alternately from the opposite sides of the carriage 40, the first and third beams labelled $b1$, and $b3$ projecting laterally from the left side of such carriage, the second and fourth beams (labelled $b2$ and $b4$) projecting laterally from the right side of the carriage and the fifth beam (labelled $b5$) located in the center of the carriage. The various ground tools 16 are anchored to their respective beams on the projecting portions so that the tools (labelled $t1$ and $t3$) assume positions at the right side of the carriage while the tools (labelled $t2$ and $t4$) assume positions at the left side of the carriage and the tool (labelled $t5$) assumes a position in the center of the carriage. If desired, the fifth beam 50 (labelled $b5$) may be replaced by one or two beams (increases tools to six) 50 projecting either to the left or right or alternately from the carriage 40 instead of in the center as illustrated.

The various ground tools 16 are capable of lateral adjustment on their associated beams 50 and thus, during initial installation of these tools, the operator will install them on the beams 50 so as to preserve the desired V-shape pattern of tool disposition.

Figure 8:
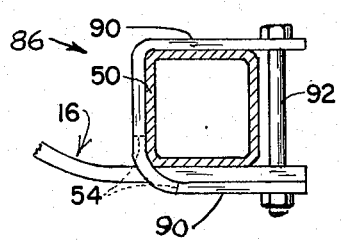
FIG. 8 is an enlarged sectional view taken substantially on the vertical plane indicated by the line 8—8 of FIG. 2 and in the direction of the arrows.
Figure 9:
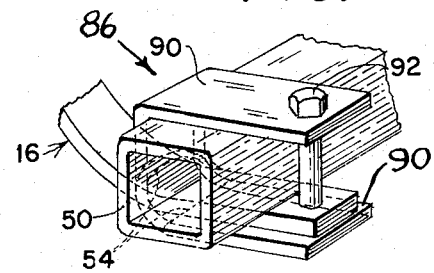
FIG. 9 is a perspective view of the structure shown in FIG. 8.

The particular fastening means for the ground tools 16 on their respective beams 50 embodies a U-shaped clamping bracket 86 (FIGS. 2, 8 and 9) having a rectangular hole 54 through which the end of the tool 16 projects, and horizontal flanges 90 which overhangs the upper and lower side of the beam 50. A clamping bolt and nut assembly 92 passing through both flanges 90 and tool 16 draws the upper flange 90 toward the end region of the tool and thus clamps the same on the beam 50. By loosening the bolt and nut assembly 92, the tool 16 is released from the beam so that it may be slid laterally thereon to any desired final position of adjustment.

It will be understood, of course that the various gauge wheels 63 function to maintain the tool-supporting carriage 40 at the proper elevation above the ground so that the desired depth of ground tool penetration will be maintained at all times during forward travel of the cultivator implement. The extent of this tool penetration may be adjusted by the simple expedient of loosening the clamping plate 74 (FIG. 2) and adjusting the vertical position of the supporting bar 66, after which the clamping plate may be retightened. In order to prevent undue ground tool penetration in the event that the gauge wheel rides into a pocket in the ground or across a small trough or the like, a limit stop bolt 94 extends through the two triangular plates 42 and 44 and is captured in position by a cotter pin 96. The bolt 94 is disposed a slight distance above the general level of the lower link 38 and is designed for engagement with the latter to limit the downward swinging movement of the four bar linkage, and consequently of the floating carriage 40. The bolt 94 also serves the function of maintaining the carriage 40 elevated for ground clearance when transporting the cultivator and at such time as the ground tools or the supporting beams therefor are removed from the carriage for purposes of tool replacement, adjustment or repair.

It is to be noted at this point that although in FIG. 1 all of the floating tool-supporting carriages 40 remain substantially the same, the arrangement of the ground tool-supporting members or beams 50 and their associated ground tools 16 differs slightly from gang to gang. For example, in the outermost right hand partial tool complement gang 14, two of the beams 50 have been omitted and the three illustrated beams project inwardly of the cultivator implement and toward the left. In the next adjacent full tool complement gang 14, the foremost beam 50 projects to the right, the sequence of beam projection from front to rear being right, left, right, left, center as previously described. In the central full tool complement gang 14 the sequence of beam projection is left, right, left, right, center. In the next adjacent full complement gang 14, i.e. the second gang from the left, the sequence of beam projection is right, left, right, left, center. In the left hand outside partial complement gang 14, the three beams 50 project inwardly of the cultivator implement and toward the right. This difference in beam projection among the various gangs 14 is illustrative of the versatility of the present cultivator implement insofar as ease of assembly is concerned. With the various tool supporting carriages 40 maintained in an elevated position by the gauge wheels as previously described, a workman need not take particular pains in assembling the tool carrying beams 50 of each gang 14 because it is very easy to start at one end of the cultivator and rearrange the beams 50 in the desired pattern by moving them laterally on each gang 14. Regardless of whether the leading beam 50 projects to the right or to the left, a reverse projection of the next adjacent beam will suffice to enable the associated tools to be located at acceptable locations which will maintain the desired V arrangement of the five ground tools 16. It is the lateral spacing of these ground tools that counts, providing of course that such spacing is commensurate with the V arrangement. Furthermore, no exact lateral projection of any given beam 50 need be maintained. The various beams may be secured by the clamping plates 80 to the lateral flanges 48 of the triangular plates 42 and 44 in approximate positions, even though there may be a beam overhang on opposite sides of the carriage 40. After the beams have been thus put in place, adjustment of the ground tools 16 thereon may be effected to attain the desired pattern of ground tool penetration thereof without disturbing the positions of the beams. When all of the ground tools 16 have been thus adjusted, the elevation of the various carriages 40 may be regulated as previously described by adjusting the positions of the gauge wheel supports 66 and thereafter retightening the clamping plates 74.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

What is claimed is:

1. In an agricultural gang-type cultivator adapted for connection to a draft vehicle, in combination, a tool bar having a centrally disposed hitch connection whereby it may be connected to the draft vehicle, a plurality of head brackets mounted on said tool bar in axially spaced relationship and each presenting laterally spaced attachment flanges, and a plurality of cultivator gangs, one for each head bracket, operatively connected to the tool bar in trailing relationship, each gang embodying a tool carriage in the form of a pair of vertically disposed laterally spaced plates having outturned horizontal bolting flanges extending along their lower edges, upper and lower draw links having their rear ends extending between and pivoted to said plates and having their forward ends extending between and pivoted to the spaced attachment flanges of the associated head bracket, said draw links, in combination with a portion of the head bracket and a portion of the tool carriage providing a parallelogram-type four bar linkage wherein the head bracket establishes a fixed link, the draw links establish swinging links, and the carriage establishes a vertically shiftable floating link, the attitude of which remains constant, a plurality of longitudinally spaced transversely extending tool-supporting beams removably secured to the underneath side of said bolting flanges, means for releasably clamping said tool-supporting beams to the bolting flanges in selected positions of axial adjustment whereby they may be caused to overhang said plates in either lateral direction, a ground tool mounted on each of said beams, a gauge wheel supporting bar having its upper end releasably and adjustably secured to one of said plates, and a ground-engaging gauge wheel mounted on the lower end of said supporting bar.

2. In an agricultural gang-type cultivator, the combination set forth in claim 1, wherein the pivotal connection between the rear ends of each draw link and the parallel plates comprises a spacer bushing, a through bolt projecting through said plates and bushing and serving to clamp the plates against the bushing, there being a cylindrical bore in said rear end of the draw link through which the bushing extends, and a grease fitting carried by said draw link for supplying lubricating oil to the interior of said bore.

3. In an agricultural gang-type cultivator, the combination set forth in claim 1, wherein each cultivator gang embodies a series of five ground tools arranged in a V pattern so as to provide a single trailing tool, two substantially laterally opposed medial tools, and two substantially laterally opposed leading tools, and the transversely extending tool-supporting beams include a pair of contiguous beams adjacent the forward ends of said bolting flanges, a pair of contiguous beams in the medial region of said bolting flanges, and a beam centered at the rear ends of said bolting flanges.

4. In an agricultural gang-type cultivator, the combination set forth in claim 1, wherein said tool-supporting beams are of hollow rectangular tubular construction and the means for releasably clamping said beams to said bolting flanges comprises flat clamping plates underlying said beams, and a series of nut and bolt assemblies project vertically through said clamping plates and bolting flanges exteriorly of the beams and serve to draw the beams hard against the underneath sides of said flanges.

5. In an agricultural gang-type cultivator, the combination set forth in claim 1, wherein the lower edge regions of said vertically disposed plates are inclined outwardly away from each other, the outturned bolting flanges are formed along the lower edges of said inclined edge regions, and said gauge wheel supporting bar projects upwardly through communicating recesses which are formed in the inclined edge regions of said one plate and in the adjacent bolting flange.

6. In an agricultural gang-type cultivator, the combination set forth in claim 5, wherein said gauge wheel supporting bar is formed of flat stock and wherein the structure releasably and adjustably securing the same to said one plate comprises a flat clamping plate which bears against the side of said bar outermost from said plate, and a pair of clamping bolts project through said clamping plate and said one plate and serving to draw the bar against said one plate in face-to-face relationship.

7. In an agricultural gang-type cultivator, the combination set forth in claim 1, wherein each cultivator gang embodies a series of five ground tools arranged in a V pattern so as to provide a single trailing tool, two substantially laterally opposed medial tools, and two substantially alterally opposed leading tools, the transversely extending tool-supporting beams include a pair of contiguous beams adjacent the forward ends of said bolting flanges, a pair of contiguous beams in the medial region of said bolting flanges, and a beam centered at the rear ends of said bolting flanges, the tool-supporting beams are of hollow rectangular tubular construction, the means for releasably clamping said beams to said bolting flanges comprises a flat clamping plate common to and underlying each of the pairs of said beams, a series of nut and bolt assemblies project vertically through said plate and bolting flanges exteriorly of the beams and serve to draw the beams hard against the underneath sides of said flanges, the lower edge regions of said vertically disposed plates are inclined outwardly away from each other, the outturned bolting flanges are formed along the lower edges of said inclined edge regions, and said gauge wheel supporting bar projects upwardly through communicating recesses which are formed in the inclined edge region of said one plate and in the adjacent bolting flange.

8. In an agricultural gang type cultivator, the combination set forth in claim 7, wherein said gauge wheel supporting bar is formed of flat stock and wherein the structure for releasably and adjustably securing the same to said one carriage plate comprises a flat clamping plate which bears against the outer side of said bar, and a pair of clamping bolts projecting through said latter clamping plate and said carriage plate and serving to draw the bar against the carriage plate in face-to-face relationship.

9. In an agricultural gang type cultivator, the combination set forth in claim 1, wherein said tool-supporting beams are of hollow square tubular construction, each ground tool is in the form of a spring tooth which is generally of S-shape configuration so as to provide a reentrant upper end region which extends horizontally and forwardly and underlies its associated supporting beam, and clamping means are provided for clamping said reentrant upper end to the underneath face of said beam in selected positions of axial adjustment relative to the beam.

10. In an agricultural gang type cultivator, the combination set forth in claim 9, wherein said clamping means for said upper end of the spring tooth includes a U-shaped bracket having a vertical flange which extends downwardly alongside the rear face of the beam and through which said upper end region of the tooth projects, and horizontal flanges which extend forwardly and overlie the upper and lower faces of the beam in overhanging relationship, and a clamping bolt extending alongside the forward face of said beam, projecting through aligned openings in the extreme forward upper end region of the spring tooth said horizontal flanges and serving to draw said upper end region of the tooth hard against said underneath face of the beam.

* * * * *